US007732786B2

(12) United States Patent
Gorrell et al.

(10) Patent No.: US 7,732,786 B2
(45) Date of Patent: Jun. 8, 2010

(54) COUPLING ENERGY IN A PLASMON WAVE TO AN ELECTRON BEAM

(75) Inventors: Jonathan Gorrell, Gainesville, FL (US); Mark Davidson, Florahome, FL (US); Michael E. Maines, Gainesville, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 970 days.

(21) Appl. No.: 11/418,078

(22) Filed: May 5, 2006

(65) Prior Publication Data

US 2007/0257622 A1 Nov. 8, 2007

(51) Int. Cl.
*G01K 1/08* (2006.01)

(52) U.S. Cl. ................... 250/397; 250/396 R; 250/400; 257/429

(58) Field of Classification Search ............. 250/396 R, 250/397, 400, 494.1, 399, 336.1; 257/428, 257/429; 315/500, 501
See application file for complete search history.

(56) References Cited

U.S. PATENT DOCUMENTS

| | | | |
|---|---|---|---|
| 1,948,384 | A | 2/1934 | Lawrence |
| 2,307,086 | A | 1/1943 | Varian et al. |
| 2,431,396 | A | 11/1947 | Hansell |
| 2,473,477 | A | 6/1949 | Smith |
| 2,634,372 | A | 4/1953 | Salisbury |
| 2,932,798 | A | 4/1960 | Kerst et al. |
| 2,944,183 | A | 7/1960 | Drexler |
| 2,966,611 | A | 12/1960 | Sandstrom |
| 3,231,779 | A | 1/1966 | White |
| 3,274,428 | A | 9/1966 | Wreford |
| 3,297,905 | A | 1/1967 | Rockwell et al. |
| 3,315,117 | A | 4/1967 | Udelson |
| 3,387,169 | A | 6/1968 | Farney |
| 3,543,147 | A | 11/1970 | Kovarik |
| 3,546,524 | A | 12/1970 | Stark |
| 3,560,694 | A | 2/1971 | White |
| 3,571,642 | A | 3/1971 | Westcott |

(Continued)

FOREIGN PATENT DOCUMENTS

EP 0237559 B1 12/1991

(Continued)

OTHER PUBLICATIONS

U.S. Appl. No. 11/418,082, filed May 5, 2006, Gorrell et al.

(Continued)

*Primary Examiner*—Haissa Philogene
(74) *Attorney, Agent, or Firm*—Davidson Berquist Jackson & Gowdey LLP

(57) ABSTRACT

A device for coupling energy in a plasmon wave to an electron beam includes a metal transmission line having a pointed end; a generator mechanism constructed and adapted to generate a beam of charged particles; and a detector microcircuit disposed adjacent to the generator mechanism. The generator mechanism and the detector microcircuit are disposed adjacent the pointed end of the metal transmission line and wherein a beam of charged particles from the generator mechanism to the detector microcircuit electrically couples the plasmon wave traveling along the metal transmission line to the microcircuit.

15 Claims, 3 Drawing Sheets

U.S. PATENT DOCUMENTS

| | | | |
|---|---|---|---|
| 3,586,899 | A | 6/1971 | Fleisher |
| 3,761,828 | A | 9/1973 | Pollard et al. |
| 3,886,399 | A | 5/1975 | Symons |
| 3,923,568 | A | 12/1975 | Bersin |
| 3,989,347 | A | 11/1976 | Eschler |
| 4,053,845 | A | 10/1977 | Gould |
| 4,269,672 | A | 5/1981 | Inoue |
| 4,282,436 | A | 8/1981 | Kapetanakos |
| 4,296,354 | A | 10/1981 | Neubauer |
| 4,450,554 | A | 5/1984 | Steensma et al. |
| 4,453,108 | A | 6/1984 | Freeman, Jr. |
| 4,482,779 | A | 11/1984 | Anderson |
| 4,528,659 | A | 7/1985 | Jones, Jr. |
| 4,589,107 | A | 5/1986 | Middleton et al. |
| 4,598,397 | A | 7/1986 | Nelson et al. |
| 4,630,262 | A | 12/1986 | Callens et al. |
| 4,652,703 | A | 3/1987 | Lu et al. |
| 4,661,783 | A | 4/1987 | Gover et al. |
| 4,704,583 | A | 11/1987 | Gould |
| 4,712,042 | A | 12/1987 | Hamm |
| 4,713,581 | A | 12/1987 | Haimson |
| 4,727,550 | A | 2/1988 | Chang et al. |
| 4,740,963 | A | 4/1988 | Eckley |
| 4,740,973 | A | 4/1988 | Madey |
| 4,746,201 | A | 5/1988 | Gould |
| 4,761,059 | A | 8/1988 | Yeh et al. |
| 4,782,485 | A | 11/1988 | Gollub |
| 4,789,945 | A | 12/1988 | Niijima |
| 4,806,859 | A | 2/1989 | Hetrick |
| 4,809,271 | A | 2/1989 | Kondo et al. |
| 4,813,040 | A | 3/1989 | Futato |
| 4,819,228 | A | 4/1989 | Baran et al. |
| 4,829,527 | A | 5/1989 | Wortman et al. |
| 4,838,021 | A | 6/1989 | Beattie |
| 4,841,538 | A | 6/1989 | Yanabu et al. |
| 4,864,131 | A | 9/1989 | Rich et al. |
| 4,866,704 | A | 9/1989 | Bergman |
| 4,866,732 | A | 9/1989 | Carey et al. |
| 4,873,715 | A | 10/1989 | Shibata |
| 4,887,265 | A | 12/1989 | Felix |
| 4,890,282 | A | 12/1989 | Lambert et al. |
| 4,898,022 | A | 2/1990 | Yumoto et al. |
| 4,912,705 | A | 3/1990 | Paneth et al. |
| 4,932,022 | A | 6/1990 | Keeney et al. |
| 4,981,371 | A | 1/1991 | Gurak et al. |
| 5,023,563 | A | 6/1991 | Harvey et al. |
| 5,036,513 | A | 7/1991 | Greenblatt |
| 5,065,425 | A | 11/1991 | Lecomte et al. |
| 5,113,141 | A | 5/1992 | Swenson |
| 5,121,385 | A | 6/1992 | Tominaga et al. |
| 5,127,001 | A | 6/1992 | Steagall et al. |
| 5,128,729 | A | 7/1992 | Alonas et al. |
| 5,130,985 | A | 7/1992 | Kondo et al. |
| 5,150,410 | A | 9/1992 | Bertrand |
| 5,155,726 | A | 10/1992 | Spinney et al. |
| 5,157,000 | A | 10/1992 | Elkind et al. |
| 5,163,118 | A | 11/1992 | Lorenzo et al. |
| 5,185,073 | A | 2/1993 | Bindra |
| 5,187,591 | A | 2/1993 | Guy et al. |
| 5,199,918 | A | 4/1993 | Kumar |
| 5,214,650 | A | 5/1993 | Renner et al. |
| 5,233,623 | A | 8/1993 | Chang |
| 5,235,248 | A | 8/1993 | Clark et al. |
| 5,262,656 | A | 11/1993 | Blondeau et al. |
| 5,263,043 | A | 11/1993 | Walsh |
| 5,268,693 | A | 12/1993 | Walsh |
| 5,268,788 | A | 12/1993 | Fox et al. |
| 5,282,197 | A | 1/1994 | Kreitzer |
| 5,283,819 | A | 2/1994 | Glick et al. |
| 5,293,175 | A | 3/1994 | Hemmie et al. |
| 5,302,240 | A | 4/1994 | Hori et al. |
| 5,305,312 | A | 4/1994 | Fornek et al. |
| 5,341,374 | A | 8/1994 | Lewen et al. |
| 5,354,709 | A | 10/1994 | Lorenzo et al. |
| 5,446,814 | A | 8/1995 | Kuo et al. |
| 5,485,277 | A | 1/1996 | Foster |
| 5,504,341 | A | 4/1996 | Glavish |
| 5,578,909 | A | 11/1996 | Billen |
| 5,604,352 | A | 2/1997 | Schuetz |
| 5,608,263 | A | 3/1997 | Drayton et al. |
| 5,637,966 | A | 6/1997 | Umstadter et al. |
| 5,663,971 | A | 9/1997 | Carlsten |
| 5,666,020 | A | 9/1997 | Takemura |
| 5,668,368 | A | 9/1997 | Sakai et al. |
| 5,705,443 | A | 1/1998 | Stauf et al. |
| 5,737,458 | A | 4/1998 | Wojnarowski et al. |
| 5,744,919 | A | 4/1998 | Mishin et al. |
| 5,757,009 | A | 5/1998 | Walstrom |
| 5,767,013 | A | 6/1998 | Park |
| 5,780,970 | A | 7/1998 | Singh et al. |
| 5,790,585 | A | 8/1998 | Walsh |
| 5,811,943 | A | 9/1998 | Mishin et al. |
| 5,821,836 | A | 10/1998 | Katehi et al. |
| 5,821,902 | A | 10/1998 | Keen |
| 5,825,140 | A | 10/1998 | Fujisawa |
| 5,831,270 | A | 11/1998 | Nakasuji |
| 5,847,745 | A | 12/1998 | Shimizu et al. |
| 5,858,799 | A | 1/1999 | Yee et al. |
| 5,889,449 | A | 3/1999 | Fiedziuszko |
| 5,889,797 | A | 3/1999 | Nguyen |
| 5,902,489 | A | 5/1999 | Yasuda et al. |
| 5,963,857 | A | 10/1999 | Greywall |
| 5,972,193 | A | 10/1999 | Chou et al. |
| 6,005,347 | A | 12/1999 | Lee |
| 6,008,496 | A | 12/1999 | Winefordner et al. |
| 6,040,625 | A | 3/2000 | Ip |
| 6,060,833 | A | 5/2000 | Velazco |
| 6,080,529 | A | 6/2000 | Ye et al. |
| 6,117,784 | A | 9/2000 | Uzoh |
| 6,139,760 | A | 10/2000 | Shim et al. |
| 6,180,415 | B1 | 1/2001 | Schultz et al. |
| 6,195,199 | B1 | 2/2001 | Yamada |
| 6,210,555 | B1 | 4/2001 | Taylor et al. |
| 6,222,866 | B1 | 4/2001 | Seko |
| 6,278,239 | B1 | 8/2001 | Caporaso et al. |
| 6,281,769 | B1 | 8/2001 | Fiedziuszko |
| 6,297,511 | B1 | 10/2001 | Syllaios et al. |
| 6,301,041 | B1 | 10/2001 | Yamada |
| 6,303,014 | B1 | 10/2001 | Taylor et al. |
| 6,309,528 | B1 | 10/2001 | Taylor et al. |
| 6,316,876 | B1 | 11/2001 | Tanabe |
| 6,338,968 | B1 | 1/2002 | Hefti |
| 6,370,306 | B1 | 4/2002 | Sato et al. |
| 6,373,194 | B1 | 4/2002 | Small |
| 6,376,258 | B2 | 4/2002 | Hefti |
| 6,407,516 | B1 | 6/2002 | Victor |
| 6,441,298 | B1 | 8/2002 | Thio |
| 6,448,850 | B1 | 9/2002 | Yamada |
| 6,453,087 | B2 | 9/2002 | Frish et al. |
| 6,470,198 | B1 | 10/2002 | Kintaka et al. |
| 6,504,303 | B2 | 1/2003 | Small |
| 6,524,461 | B2 | 2/2003 | Taylor et al. |
| 6,525,477 | B2 | 2/2003 | Small |
| 6,534,766 | B2 | 3/2003 | Abe et al. |
| 6,545,425 | B2 | 4/2003 | Victor |
| 6,552,320 | B1 | 4/2003 | Pan |
| 6,577,040 | B2 | 6/2003 | Nguyen |
| 6,580,075 | B2 | 6/2003 | Kametani et al. |
| 6,603,781 | B1 | 8/2003 | Stinson et al. |
| 6,603,915 | B2 | 8/2003 | Glebov et al. |
| 6,624,916 | B1 | 9/2003 | Green et al. |
| 6,636,185 | B1 | 10/2003 | Spitzer et al. |
| 6,636,534 | B2 | 10/2003 | Madey et al. |
| 6,636,653 | B2 | 10/2003 | Miracky et al. |

6,640,023 B2 10/2003 Miller et al.
6,642,907 B2 11/2003 Hamada et al.
6,687,034 B2 2/2004 Wine et al.
6,700,748 B1 3/2004 Cowles et al.
6,724,486 B1 4/2004 Shull et al.
6,738,176 B2 5/2004 Rabinowitz et al.
6,741,781 B2 5/2004 Furuyama
6,777,244 B2 8/2004 Pepper et al.
6,782,205 B2 8/2004 Trisnadi et al.
6,791,438 B2 9/2004 Takahashi et al.
6,800,877 B2 10/2004 Victor et al.
6,801,002 B2 10/2004 Victor et al.
6,819,432 B2 11/2004 Pepper et al.
6,829,286 B1 12/2004 Guilfoyle et al.
6,834,152 B2 12/2004 Gunn et al.
6,870,438 B1 3/2005 Shino et al.
6,871,025 B2 3/2005 Maleki et al.
6,885,262 B2 4/2005 Nishimura et al.
6,900,447 B2 5/2005 Gerlach et al.
6,908,355 B2 6/2005 Habib et al.
6,909,092 B2 6/2005 Nagahama
6,909,104 B1 6/2005 Koops
6,924,920 B2 8/2005 Zhilkov
6,936,981 B2 8/2005 Gesley
6,943,650 B2 9/2005 Ramprasad et al.
6,944,369 B2 9/2005 Deliwala
6,952,492 B2 10/2005 Tanaka et al.
6,953,291 B2 10/2005 Liu
6,954,515 B2 10/2005 Bjorkholm et al.
6,965,284 B2 11/2005 Maekawa et al.
6,965,625 B2 11/2005 Mross et al.
6,972,439 B1 12/2005 Kim et al.
6,995,406 B2 2/2006 Tojo et al.
7,010,183 B2 3/2006 Estes et al.
7,064,500 B2 6/2006 Victor et al.
7,068,948 B2 6/2006 Wei et al.
7,092,588 B2 8/2006 Kondo
7,092,603 B2 8/2006 Glebov et al.
7,099,586 B2 8/2006 Yoo
7,120,332 B1 10/2006 Spoonhower et al.
7,122,978 B2 10/2006 Nakanishi et al.
7,130,102 B2 10/2006 Rabinowitz
7,177,515 B2 2/2007 Estes et al.
7,194,798 B2 3/2007 Bonhote et al.
7,230,201 B1 6/2007 Miley et al.
7,253,426 B2 8/2007 Gorrell et al.
7,267,459 B2 9/2007 Matheson
7,267,461 B2 9/2007 Kan et al.
7,309,953 B2 12/2007 Tiberi et al.
7,342,441 B2 3/2008 Gorrell et al.
7,359,589 B2 4/2008 Gorrell et al.
7,361,916 B2 4/2008 Gorrell et al.
7,362,972 B2 4/2008 Yavor et al.
7,375,631 B2 5/2008 Moskowitz et al.
7,435,488 B2 * 10/2008 Tomita et al. ............... 428/702
7,436,177 B2 10/2008 Gorrell et al.
7,442,940 B2 10/2008 Gorrell et al.
7,443,358 B2 10/2008 Gorrell et al.
7,459,099 B2 12/2008 Kubena et al.
7,470,920 B2 12/2008 Gorrell et al.
7,473,917 B2 1/2009 Singh
7,554,083 B2 * 6/2009 Gorrell et al. ............ 250/336.1
7,569,836 B2 * 8/2009 Gorrell ....................... 250/400
7,573,045 B2 * 8/2009 Gorrell et al. ............... 250/399
7,586,097 B2 9/2009 Gorrell et al.
7,586,167 B2 9/2009 Gorrell et al.
2001/0002315 A1 5/2001 Schultz et al.
2001/0025925 A1 10/2001 Abe et al.
2001/0045360 A1 11/2001 Omasa
2002/0009723 A1 1/2002 Hefti
2002/0027481 A1 3/2002 Fiedziuszko
2002/0036121 A1 3/2002 Ball et al.
2002/0036264 A1 3/2002 Nakasuji et al.
2002/0053638 A1 5/2002 Winkler et al.
2002/0056645 A1 5/2002 Taylor et al.
2002/0068018 A1 6/2002 Pepper et al.
2002/0070671 A1 6/2002 Small
2002/0071457 A1 6/2002 Hogan
2002/0122531 A1 9/2002 Whitham
2002/0135665 A1 9/2002 Gardner
2002/0139961 A1 10/2002 Kinoshita et al.
2002/0158295 A1 10/2002 Armgarth et al.
2002/0191650 A1 12/2002 Madey et al.
2003/0010979 A1 1/2003 Pardo
2003/0012925 A1 1/2003 Gorrell
2003/0016421 A1 1/2003 Small
2003/0034535 A1 2/2003 Barenburu et al.
2003/0103150 A1 6/2003 Catrysse et al.
2003/0106998 A1 6/2003 Colbert et al.
2003/0155521 A1 8/2003 Feuerbaum
2003/0158474 A1 8/2003 Scherer et al.
2003/0164947 A1 9/2003 Vaupel
2003/0179974 A1 9/2003 Estes et al.
2003/0206708 A1 11/2003 Estes et al.
2003/0214695 A1 11/2003 Abramson et al.
2003/0222579 A1 12/2003 Habib et al.
2004/0011432 A1 1/2004 Podlaha et al.
2004/0061053 A1 4/2004 Taniguchi et al.
2004/0080285 A1 4/2004 Victor et al.
2004/0085159 A1 5/2004 Kubena et al.
2004/0092104 A1 5/2004 Gunn, III et al.
2004/0108471 A1 6/2004 Luo et al.
2004/0108473 A1 6/2004 Melnychuk et al.
2004/0108823 A1 6/2004 Amaldi et al.
2004/0136715 A1 7/2004 Kondo
2004/0150991 A1 8/2004 Ouderkirk et al.
2004/0154925 A1 8/2004 Podlaha et al.
2004/0171272 A1 9/2004 Jin et al.
2004/0180244 A1 9/2004 Tour et al.
2004/0184270 A1 9/2004 Halter
2004/0213375 A1 10/2004 Bjorkholm et al.
2004/0217297 A1 11/2004 Moses et al.
2004/0218651 A1 11/2004 Iwasaki et al.
2004/0231996 A1 11/2004 Webb
2004/0240035 A1 12/2004 Zhilkov
2004/0264867 A1 12/2004 Kondo
2005/0023145 A1 2/2005 Cohen et al.
2005/0045821 A1 3/2005 Noji et al.
2005/0045832 A1 3/2005 Kelly et al.
2005/0054151 A1 3/2005 Lowther et al.
2005/0062903 A1 3/2005 Cok et al.
2005/0067286 A1 3/2005 Ahn et al.
2005/0082469 A1 4/2005 Carlo
2005/0092929 A1 5/2005 Schneiker
2005/0104684 A1 5/2005 Wojcik
2005/0105595 A1 5/2005 Martin et al.
2005/0105690 A1 5/2005 Pau et al.
2005/0145882 A1 7/2005 Taylor et al.
2005/0152635 A1 7/2005 Paddon et al.
2005/0162104 A1 7/2005 Victor et al.
2005/0180678 A1 8/2005 Panepucci et al.
2005/0190637 A1 9/2005 Ichimura et al.
2005/0191055 A1 9/2005 Maruyama et al.
2005/0194258 A1 9/2005 Cohen et al.
2005/0201707 A1 9/2005 Glebov et al.
2005/0201717 A1 9/2005 Matsumura et al.
2005/0206314 A1 9/2005 Habib et al.
2005/0212503 A1 9/2005 Deibele
2005/0231138 A1 10/2005 Nakanishi et al.
2005/0249451 A1 11/2005 Baehr-Jones et al.
2005/0285541 A1 12/2005 LeChevalier
2006/0007730 A1 1/2006 Nakamura et al.
2006/0018619 A1 1/2006 Helffrich et al.
2006/0035173 A1 2/2006 Davidson et al.
2006/0045418 A1 3/2006 Cho et al.
2006/0050269 A1 3/2006 Brownell

| | | | | |
|---|---|---|---|---|
| 2006/0060782 | A1 | 3/2006 | Khursheed | |
| 2006/0062258 | A1 | 3/2006 | Brau et al. | |
| 2006/0131176 | A1 | 6/2006 | Hsu | |
| 2006/0131695 | A1 | 6/2006 | Kuekes et al. | |
| 2006/0159131 | A1 | 7/2006 | Liu et al. | |
| 2006/0164496 | A1 | 7/2006 | Tokutake et al. | |
| 2006/0187794 | A1 | 8/2006 | Harvey et al. | |
| 2006/0208667 | A1 | 9/2006 | Lys et al. | |
| 2006/0216940 | A1 | 9/2006 | Gorrell et al. | |
| 2006/0232364 | A1 | 10/2006 | Koh et al. | |
| 2006/0243925 | A1 | 11/2006 | Barker et al. | |
| 2006/0274922 | A1 | 12/2006 | Ragsdale | |
| 2007/0003781 | A1 | 1/2007 | de Rochemont | |
| 2007/0013765 | A1 | 1/2007 | Hudson et al. | |
| 2007/0075263 | A1 | 4/2007 | Gorrell et al. | |
| 2007/0075264 | A1 | 4/2007 | Gorrell et al. | |
| 2007/0085039 | A1 | 4/2007 | Gorrell et al. | |
| 2007/0086915 | A1 | 4/2007 | LeBoeuf et al. | |
| 2007/0116420 | A1 | 5/2007 | Estes et al. | |
| 2007/0146704 | A1 | 6/2007 | Schmidt et al. | |
| 2007/0152176 | A1 | 7/2007 | Gorrell et al. | |
| 2007/0154846 | A1 | 7/2007 | Gorrell et al. | |
| 2007/0194357 | A1 | 8/2007 | Oohashi et al. | |
| 2007/0200940 | A1 | 8/2007 | Gruhlke et al. | |
| 2007/0238037 | A1 | 10/2007 | Wuister et al. | |
| 2007/0252983 | A1 | 11/2007 | Tong et al. | |
| 2007/0258492 | A1 | 11/2007 | Gorrell | |
| 2007/0258689 | A1 | 11/2007 | Gorrell et al. | |
| 2007/0258690 | A1 | 11/2007 | Gorrell et al. | |
| 2007/0258720 | A1 | 11/2007 | Gorrell et al. | |
| 2007/0259641 | A1 | 11/2007 | Gorrell | |
| 2007/0264023 | A1 | 11/2007 | Gorrell et al. | |
| 2007/0264030 | A1 | 11/2007 | Gorrell et al. | |
| 2007/0282030 | A1 | 12/2007 | Anderson et al. | |
| 2007/0284527 | A1 | 12/2007 | Zani et al. | |
| 2008/0069509 | A1 | 3/2008 | Gorrell et al. | |
| 2008/0083881 | A1* | 4/2008 | Gorrell et al. | 250/399 |
| 2008/0218102 | A1 | 9/2008 | Sliski et al. | |
| 2008/0283501 | A1 | 11/2008 | Roy | |
| 2008/0302963 | A1 | 12/2008 | Nakasuji et al. | |

FOREIGN PATENT DOCUMENTS

| | | | |
|---|---|---|---|
| JP | 2004-32323 | A | 1/2004 |
| WO | WO 87/01873 | | 3/1987 |
| WO | WO 93/21663 | A1 | 10/1993 |
| WO | WO 00/72413 | | 11/2000 |
| WO | WO 2000/072413 | | 11/2000 |
| WO | WO 02/025785 | | 3/2002 |
| WO | WO 02/25785 | | 3/2002 |
| WO | WO 02/077607 | | 10/2002 |
| WO | WO 2004/086560 | | 10/2004 |
| WO | WO 2005/015143 | A2 | 2/2005 |
| WO | WO 2005/098966 | | 10/2005 |
| WO | WO 2006/042239 | A2 | 4/2006 |
| WO | WO 2007/081389 | | 7/2007 |
| WO | WO 2007/081390 | | 7/2007 |
| WO | WO 2007/081391 | | 7/2007 |

OTHER PUBLICATIONS

J. C. Palais, "Fiber optic communications," Prentice Hall, New Jersey, 1998, pp. 156-158.

Search Report and Written Opinion mailed Dec. 20, 2007 in PCT Appln. No. PCT/US2006/022771.

Search Report and Written Opinion mailed Jan. 31, 2008 in PCT Appln. No. PCT/US2006/027427.

Search Report and Written Opinion mailed Jan. 8, 2008 in PCT Appln. No. PCT/US2006/028741.

Search Report and Written Opinion mailed Mar. 11, 2008 in PCT Appln. No. PCT/US2006/022679.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

Markoff, John, "A Chip That Can Transfer Data Using Laser Light," The New York Times, Sep. 18, 2006.

S.M. Sze, "Semiconductor Devices Physics and Technology", 2nd Edition, Chapters 9 and 12, Copyright 1985, 2002.

Search Report and Written Opinion mailed Feb. 12, 2007 in PCT Appln. No. PCT/US2006/022682.

Search Report and Written Opinion mailed Feb. 20, 2007 in PCT Appln. No. PCT/US2006/022676.

Search Report and Written Opinion mailed Feb. 20, 2007 in PCT Appln. No. PCT/US2006/022772.

Search Report and Written Opinion mailed Feb. 20, 2007 in PCT Appln. No. PCT/US2006/022780.

Search Report and Written Opinion mailed Feb. 21, 2007 in PCT Appln. No. PCT/US2006/022684.

Search Report and Written Opinion mailed Jan. 17, 2007 in PCT Appln. No. PCT/US2006/022777.

Search Report and Written Opinion mailed Jan. 23, 2007 in PCT Appln. No. PCT/US2006/022781.

Search Report and Written Opinion mailed Mar. 7, 2007 in PCT Appln. No. PCT/US2006/022775.

Thurn-Albrecht et al., "Ultrahigh-Density Nanowire Arrays Grown in Self-Assembled Diblock Copolymer Templates", Science 290. 5499, Dec. 15, 2000, pp. 2126-2129.

Search Report and Written Opinion mailed Apr. 23, 2008 in PCT Appln. No. PCT/US2006/022678.

Search Report and Written Opinion mailed Apr. 3, 2008 in PCT Appln. No. PCT/US2006/027429.

Search Report and Written Opinion mailed Jun. 18, 2008 in PCT Appln. No. PCT/US2006/027430.

Search Report and Written Opinion mailed Jun. 3, 2008 in PCT Appln. No. PCT/US2006/022783.

Search Report and Written Opinion mailed Mar. 24, 2008 in PCT Appln. No. PCT/US2006/022677.

Search Report and Written Opinion mailed Mar. 24, 2008 in PCT Appln. No. PCT/US2006/022784.

Search Report and Written Opinion mailed May 2, 2008 in PCT Appln. No. PCT/US2006/023280.

Search Report and Written Opinion mailed May 21, 2008 in PCT Appln. No. PCT/US2006/023279.

Search Report and Written Opinion mailed May 22, 2008 in PCT Appln. No. PCT/US2006/022685.

"Notice of Allowability" mailed on Jul. 2, 2009 in U.S. Appl. No. 11/410,905, filed Apr. 26, 2006.

"Notice of Allowability" mailed on Jun. 30, 2009 in U.S. Appl. No. 11/418,084, filed May 5, 2006.

B. B Loechel et al., "Fabrication of Magnetic Microstructures by Using Thick Layer Resists", Microelectronics Eng., vol. 21, pp. 463-466 (1993).

Magellan 8500 Scanner Product Reference Guide, PSC Inc., 2004, pp. 6-27-F18.

Magellan 9500 with SmartSentry Quick Reference Guide, PSC Inc., 2004.

Response to Non-Final Office Action submitted May 13, 2009 in U.S. Appl. No. 11/203,407.

U.S. Appl. No. 11/238,991—May 11, 2009 PTO Office Action.

U.S. Appl. No. 11/350,812—Apr. 17, 2009 Office Action.

U.S. Appl. No. 11/411,130—Jun. 23, 2009 PTO Office Action.

U.S. Appl. No. 11/418,096—Jun. 23, 2009 PTO Office Action.

U.S. Appl. No. 11/433,486—Jun. 19, 2009 PTO Office Action.

International Search Report and Written Opinion mailed Nov. 23, 2007 in International Application No. PCT/US2006/022786.

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.

Search Report and Written Opinion mailed Sep. 25, 2007 in PCT Appln. No. PCT/US2006/022681.

Search Report and Written Opinion mailed Sep. 26, 2007 in PCT Appln. No. PCT/US2006/024218.
Search Report and Written Opinion mailed Aug. 24, 2007 in PCT Appln. No. PCT/US2006/022768.
Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jun. 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
"Array of Nanoklystrons for Frequency Agility or Redundancy," NASA's Jet Propulsion Laboratory, NASA Tech Briefs, NPO-21033. 2001.
"Antenna Arrays." May 18, 2002. www.tpub.com/content/neets/14183/css/14183_159.htm.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Brau, C.A. et al., "Gain and Coherent Radiation from a Smith-Purcell Free Electron Laser," Proceedings of the 2004 FEL Conference, pp. 278-281.
Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30,IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-Ir, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.
Jonietz, Erika, "Nano Antenna Gold nanospheres show path to all-optical computing," Technology Review, Dec. 2005/Jan. 2006, p. 32.
Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995, pp. 117-121.
Joo, Youngcheol et al., "Fabrication of Monolithic Microchannels for IC Chip Cooling," 1995, Mechanical, Aerospace and Nuclear Engineering Department, University of California at Los Angeles.
Jung, K.B. et al., "Patterning of Cu, Co, Fe, and Ag for magnetic nanostructures," J. Vac. Sci. Technol. A 15(3), May/Jun. 1997, pp. 1780-1784.
Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.
Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.
Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.
Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.
Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.
Manohara, Harish et al., "Field Emission Testing of Carbon Nanotubes for THz Frequency Vacuum Microtube Sources." Abstract. Dec. 2003. from SPIEWeb.
McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.
Meyer, Stephan, "Far IR, Sub-MM & MM Detector Technology Workshop Summary," Oct. 2002. (may date the Manohara documents).
Mokhoff, Nicolas, "Optical-speed light detector promises fast space talk," EETimes Online, Mar. 20, 2006, from website: www.eetimes.com/showArticle.jhtml?articleID=183701047.
Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.
Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.
Phototonics Research, "Surface-Plasmon-Enhanced Random Laser Demonstrated," Phototonics Spectra, Feb. 2005, pp. 112-113.

Potylitsin, A.P., "Resonant Diffraction Radiation and Smith-Purcell Effect," (Abstract), arXiv: physics/9803043 v2 Apr. 13, 1998.
Potylitsyn, A.P., "Resonant Diffraction Radiation and Smith-Purcell Effect," Physics Letters A, Feb. 2, 1998, pp. 112-116, A 238, Elsevier Science B.V.
S. Hoogland et al., "A solution-processed 1.53 μm quantum dot laser with temperature-invariant emission wavelength," Optics Express, vol. 14, No. 8, Apr. 17, 2006, pp. 3273-3281.
Savilov, Andrey V., "Stimulated Wave Scattering in the Smith-Purcell FEL," IEEE Transactions on Plasma Science, Oct. 2001, pp. 820-823, vol. 29 No. 5, IEEE.
Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.
Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.
Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.
Shih, I. et al., "Experimental Investigations of Smith-Purcell Radiation," Journal of the Optical Society of America, Mar. 1990, pp. 351-356, vol. 7, No. 3, Optical Society of America.
Shih, I. et al., "Measurements of Smith-Purcell Radiation," Journal of the Optical Society of America, Mar. 1990, pp. 345-350, vol. 7 No. 3, Optical Society of America.
Swartz, J.C. et al., "THz-FIR Grating Coupled Radiation Source," Plasma Science, 1998. 1D02, p. 126.
Temkin, Richard, "Scanning with Ease Through the Far Infrared," Science, New Series, May 8, 1998, p. 854, vol. 280, No. 5365, American Association for the Advancement of Science.
Walsh, J.E., et al., 1999. From website: http://www.ieee.org/organizations/pubs/newsletters/leos/feb99/hot2.htm.
Wentworth, Stuart M. et al., "Far-Infrared Composite Microbolometers," IEEE MTT-S Digest, 1990, pp. 1309-1310.
Yamamoto, N. et al., "Photon Emission From Silver Particles Induced by a High-Energy Electron Beam," Physical Review B, Nov. 6, 2001, pp. 205419-1-205419-9, vol. 64, The American Physical Society.
Yokoo, K. et al., "Smith-Purcell Radiation at Optical Wavelength Using a Field-Emitter Array," Technical Digest of IVMC, 2003, pp. 77-78.
Zeng, Yuxiao et al., "Processing and encapsulation of silver patterns by using reactive ion etch and ammonia anneal," Materials Chemistry and Physics 66, 2000, pp. 77-82.
Mar. 6, 2009 Response to PTO Office Action of Sep. 16, 2008 in U.S. Appl. No. 11/418,085.
Mar. 17, 2008 PTO Office Action in U.S. Appl. No. 11/353,208.
Mar. 19, 2009 PTO Office Action in U.S. Appl. No. 11/411,120.
Mar. 24, 2006 PTO Office Action in U.S. Appl. No. 10/917,511.
Mar. 25, 2008 PTO Office Action in U.S. Appl. No. 11/411,131.
Mar. 26, 2009 Response to PTO Office Action of Sep. 26, 2008 in U.S. Appl. No. 11/410,905.
Mar. 31, 2008 PTO Office Action in U.S. Appl. No. 11/418,315.
Apr. 8, 2008 PTO Office Action in U.S. Appl. No. 11/325,571.
Apr. 11, 2008 PTO Office Action in U.S. Appl. No. 11/418,079.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 5, 2008 Response to PTO Office Action of Nov. 5, 2007 in U.S. Appl. No. 11/418,084.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 11, 2008 PTO Office Action in U.S. Appl. No. 11/325,534.
Jun. 16, 2008 Response to PTO Office Action of Dec. 14, 2007 in U.S. Appl. No. 11/418,264.
Jun. 20, 2008 PTO Office Action in U.S. Appl. No. 11/418,083.
Jun. 20, 2008 Response to PTO Office Action of Mar. 25, 2008 in U.S. Appl. No. 11/411,131.
Jul. 1, 2008 PTO Office Action in U.S. Appl. No. 11/418,244.
Aug. 10, 2007 PTO Office Action in U.S. Appl. No. 11/418,085.
Aug. 12, 2008 Response to PTO Office Action of Feb. 12, 2008 in U.S. Appl. No. 11/418,085.
Aug. 14, 2006 PTO Office Action in U.S. Appl. No. 10/917,511.
Aug. 19, 2008 PTO Office Action in U.S. Appl. No. 11/418,084.
Sep. 1, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Sep. 15, 2008 Response to PTO Office Action of Mar. 17, 2008 in U.S. Appl. No. 11/353,208.
Sep. 16, 2008 PTO Office Action in U.S. Appl. No. 11/418,085.
Sep. 26, 2008 PTO Office Action in U.S. Appl. No. 11/410,905.
Oct. 7, 2008 Response to PTO Office Action of Apr. 11, 2008 in U.S. Appl. No. 11/418,079.
Oct. 15, 2008 Response to PTO Office Action of Jun. 11, 2008 in U.S. Appl. No. 11/325,534.
Oct. 19, 2007 Response to PTO Office Action of May 21, 2007 in U.S. Appl. No. 11/418,087.
Nov. 5, 2007 PTO Office Action in U.S. Appl. No. 11/418,084.
Nov. 13, 2007 Response to PTO Office Action of Aug. 10, 2007 in U.S. Appl. No. 11/418,085.
Nov. 25, 2008 Response to PTO Office Action of Jul. 1, 2008 in U.S. Appl. No. 11/418,244.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 18, 2008 Response to PTO Office Action of Jun. 20, 2008 in U.S. Appl. No. 11/418,083.
Dec. 20, 2007 PTO Office Action in U.S. Appl. No. 11/418,087.
Dec. 24, 2008 PTO Office Action in U.S. Appl. No. 11/353,208.
European Search Report mailed Mar. 3, 2009 in European Application No. 06852028.7.
U.S. Appl. No. 11/203,407—Nov. 13, 2008 PTO Office Action.
U.S. Appl. No. 11/238,991—Dec. 6, 2006 PTO Office Action.
U.S. Appl. No. 11/238,991—Jun. 6, 2007 Response to PTO Office Action of Dec. 6, 2006.
U.S. Appl. No. 11/238,991—Sep. 10, 2007 PTO Office Action.
U.S. Appl. No. 11/238,991—Mar. 6, 2008 Response to PTO Office Action of Sep. 10, 2007.
U.S. Appl. No. 11/238,991—Jun. 27, 2008 PTO Office Action.
U.S. Appl. No. 11/238,991—Dec. 29, 2008 Response to PTO Office Action of Jun. 27, 2008.
U.S. Appl. No. 11/238,991—Mar. 24, 2009 PTO Office Action.
U.S. Appl. No. 11/243,477—Apr. 25, 2008 PTO Office Action.
U.S. Appl. No. 11/243,477—Oct. 24, 2008 Response to PTO Office Action of Apr. 25, 2008.
U.S. Appl. No. 11/243,477—Jan. 7, 2009 PTO Office Action.
U.S. Appl. No. 11/325,448—Jun. 16, 2008 PTO Office Action.
U.S. Appl. No. 11/325,448—Dec. 16, 2008 Response to PTO Office Action of Jun. 16, 2008.
U.S. Appl. No. 11/353,208—Jan. 15, 2008 PTO Office Action.
U.S. Appl. No. 11/353,208—Dec. 30, 2008 Response to PTO Office Action of Dec. 24, 2008.
U.S. Appl. No. 11/400,280—Oct. 16, 2008 PTO Office Action.
U.S. Appl. No. 11/400,280—Oct. 24, 2008 Response to PTO Office Action of Oct. 16, 2008.
U.S. Appl. No. 11/410,924—Mar. 6, 2009 PTO Office Action.
U.S. Appl. No. 11/411,129—Jan. 16, 2009 Office Action.
U.S. Appl. No. 11/411,130—May 1, 2008 PTO Office Action.
U.S. Appl. No. 11/411,130—Oct. 29, 2008 Response to PTO Office Action of May 1, 2008.
U.S. Appl. No. 11/417,129—Jul. 11, 2007 PTO Office Action.
U.S. Appl. No. 11/417,129—Dec. 17, 2007 Response to PTO Office Action of Jul. 11, 2007.
U.S. Appl. No. 11/417,129—Dec. 20, 2007 Response to PTO Office Action of Jul. 11, 2007.
U.S. Appl. No. 11/417,129—Apr. 17, 2008 PTO Office Action.

U.S. Appl. No. 11/417,129—Jun. 19, 2008 Response to PTO Office Action of Apr. 17, 2008.
U.S. Appl. No. 11/418,079—Feb. 12, 2009 PTO Office Action.
U.S. Appl. No. 11/418,080—Mar. 18, 2009 PTO Office Action.
U.S. Appl. No. 11/418,082—Jan. 17, 2007 PTO Office Action.
U.S. Appl. No. 11/418,084—Feb. 19, 2009 Response to PTO Office Action of Aug. 19, 2008.
U.S. Appl. No. 11/418,085—Feb. 12, 2008 PTO Office Action.
U.S. Appl. No. 11/418,087—Dec. 29, 2006 Response to PTO Office Action of Dec. 4, 2006.
U.S. Appl. No. 11/418,087—Feb. 15, 2007 PTO Office Action.
U.S. Appl. No. 11/418,087—Mar. 6, 2007 Response to PTO Office Action of Feb. 15, 2007.
U.S. Appl. No. 11/418,088—Jun. 9, 2008 PTO Office Action.
U.S. Appl. No. 11/418,088—Dec. 8, 2008 Response to PTO Office Action of Jun. 9, 2008.
U.S. Appl. No. 11/418,089—Mar. 21, 2008 PTO Office Action.
U.S. Appl. No. 11/418,089—Jun. 23, 2008 Response to PTO Office Action of Mar. 21, 2008.
U.S. Appl. No. 11/418,089—Sep. 30, 2008 PTO Office Action.
U.S. Appl. No. 11/418,089—Mar. 30, 2009 Response to PTO Office Action of Sep. 30, 2008.
U.S. Appl. No. 11/418,091—Jul. 30, 2007 PTO Office Action.
U.S. Appl. No. 11/418,091—Nov. 27, 2007—Response to PTO Office Action of Jul. 30, 2007.
U.S. Appl. No. 11/418,091—Feb. 26, 2008 PTO Office Action.
U.S. Appl. No. 11/418,097—Jun. 2, 2008 PTO Office Action.
U.S. Appl. No. 11/418,097—Dec. 2, 2008 Response to PTO Office Action of Jun. 2, 2008.
U.S. Appl. No. 11/418,097—Feb. 18, 2009 PTO Office Action.
U.S. Appl. No. 11/418,099—Jun. 23, 2008 PTO Office Action.
U.S. Appl. No. 11/418,099—Dec. 23, 2008 Response to PTO Office Action of Jun. 23, 2008.
U.S. Appl. No. 11/418,100—Jan. 12, 2009 PTO Office Action.
U.S. Appl. No. 11/418,123—Apr. 25, 2008 PTO Office Action.
U.S. Appl. No. 11/418,123—Oct. 27, 2008 Response to PTO Office Action of Apr. 25, 2008.
U.S. Appl. No. 11/418,123—Jan. 26, 2009 PTO Office Action.
U.S. Appl. No. 11/418,124—Oct. 1, 2008 PTO Office Action.
U.S. Appl. No. 11/418,124—Feb. 2, 2009 Response to PTO Office Action of Oct. 1, 2008.
U.S. Appl. No. 11/418,124—Mar. 13, 2009 PTO Office Action.
U.S. Appl. No. 11/418,126—Oct. 12, 2006 PTO Office Action.
U.S. Appl. No. 11/418,126—Feb. 12, 2007 Response to PTO Office Action of Oct. 12, 2006 (Redacted).
U.S. Appl. No. 11/418,126—Jun. 6, 2007 PTO Office Action.
U.S. Appl. No. 11/418,126—Aug. 6, 2007 Response to PTO Office Action of Jun. 6, 2007.
U.S. Appl. No. 11/418,126—Nov. 2, 2007 PTO Office Action.
U.S. Appl. No. 11/418,126—Feb. 22, 2008 Response to PTO Office Action of Nov. 2, 2007.
U.S. Appl. No. 11/418,126—Jun. 10, 2008 PTO Office Action.
U.S. Appl. No. 11/418,127—Apr. 2, 2009 Office Action.
U.S. Appl. No. 11/418,128—Dec. 16, 2008 PTO Office Action.
U.S. Appl. No. 11/418,128—Dec. 31, 2008 Response to PTO Office Action of Dec. 16, 2008.
U.S. Appl. No. 11/418,128—Feb. 17, 2009 PTO Office Action.
U.S. Appl. No. 11/418,129—Dec. 16, 2008 Office Action.
U.S. Appl. No. 11/418,129—Dec. 31, 2008 Response to PTO Office Action of Dec. 16, 2008.
U.S. Appl. No. 11/418,263—Sep. 24, 2008 PTO Office Action.
U.S. Appl. No. 11/418,263—Dec. 24, 2008 Response to PTO Office Action of Sep. 24, 2008.
U.S. Appl. No. 11/418,263—Mar. 9, 2009 PTO Office Action.
U.S. Appl. No. 11/418,318—Mar. 31, 2009 PTO Office Action.
U.S. Appl. No. 11/441,219—Jan. 7, 2009 PTO Office Action.
U.S. Appl. No. 11/522,929—Oct. 22, 2007 PTO Office Action.
U.S. Appl. No. 11/522,929—Feb. 21, 2008 Response to PTO Office Action of Oct. 22, 2007.
U.S. Appl. No. 11/641,678—Jul. 22, 2008 PTO Office Action.
U.S. Appl. No. 11/641,678—Jan. 22, 2009 Response to Office Action of Jul. 22, 2008.
U.S. Appl. No. 11/711,000—Mar. 6, 2009 PTO Office Action.
U.S. Appl. No. 11/716,552—Feb. 12, 2009 Response to PTO Office Action of Feb. 9, 2009.
U.S. Appl. No. 11/716,552—Jul. 3, 2008 PTO Office Action.
"An Early History—Invention of the Klystron," http://varianinc.com/cgi-bin/advprint/print.cgi?cid=KLQNPPJJFJ, printed on Dec. 26, 2008.
"An Early History—The Founding of Varian Associates," http://varianinc.com/cgi-bin/advprint/print.cgi?cid=KLQNPPJJFJ, printed on Dec. 26, 2008.
"Chapter 3 E-Ray Tube," http://compepid.tuskegee.edu/syllabi/clinical/small/radiology/chapter..., printed from tuskegee.edu on Dec. 29, 2008.
"Diagnostic imaging modalities—Ionizing vs non-ionizing radiation," http://info.med.yale.edu/intmed/cardio/imaging/techniques/ionizing_v..., printed from Yale University School of Medicine on Dec. 29, 2008.
"Frequently Asked Questions," Luxtera Inc., found at http://www.luxtera.com/technology__faq.htm, printed on Dec. 2, 2005, 4 pages.
"Klystron Amplifier," http://www.radartutorial.eu/08.transmitters/tx12.en.html, printed on Dec. 26, 2008.
"Klystron is a Micowave Generator," http://www2.slac.stanford.edu/vvc/accelerators/klystron.html, printed on Dec. 26, 2008.
"Klystron," http:en.wikipedia.org/wiki/Klystron, printed on Dec. 26, 2008.
"Making E-rays," http://www.fnrfscience.cmu.ac.th/theory/radiation/xray-basics.html, printed on Dec. 29, 2008.
"Microwave Tubes," http://www.tpub.com/neets/book11/45b.htm, printed on Dec. 26, 2008.
"Notice of Allowability" mailed on Jan. 17, 2008 in U.S. Appl. No. 11/418,082 filed May 5, 2006.
"Technology Overview," Luxtera, Inc., found at http://www.luxtera.com/technology.htm, printed on Dec. 2, 2005, 1 page.
"The Reflex Klystron," http://www.fnrfscience.cmu.ac.th/theory/microwave/microwave%2, printed from Fast Netoron Research Facilty on Dec. 26, 2008.
"x-ray tube," http://www.answers.com/topic/x-ray-tube, printed on Dec. 29, 2008.
Corcoran, Elizabeth, "Ride the Light," Forbes Magazine, Apr. 11, 2005, pp. 68-70.
Neo et al., "Smith-Purcell Radiation from Ultraviolet to Infrared Using a Si-field Emitter" Vacuum Electronics Conference, 2007, IVEC '07, IEEE International May 2007.
Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.
Sartori, Gabriele, "CMOS Photonics Platform," Luxtera, Inc., Nov. 2005, 19 pages.
Search Report and Writen Opinion mailed Jul. 14, 2008 in PCT Appl. No. PCT/US2006/022773.
Search Report and Written Opinion mailed Apr. 23, 2008 in PCT Appl. No. PCT/US2006/022678.
Search Report and Written Opinion mailed Apr. 3, 2008 in PCT Appl. No. PCT/US2006/027429.
Search Report and Written Opinion mailed Aug. 19, 2008 in PCT Appl. No. PCT/US2007/008363.
Search Report and Written Opinion mailed Jul. 16, 2008 in PCT Appl. No. PCT/US2006/022766.
Search Report and Written Opinion mailed Jul. 28, 2008 in PCT Appl. No. PCT/US2006/022782.
Search Report and Written Opinion mailed Jul. 3, 2008 in PCT Appl. No. PCT/US2006/022690.
Search Report and Written Opinion mailed Jul. 3, 2008 in PCT Appl. No. PCT/US2006/022778.
Search Report and Written Opinion mailed Jul. 7, 2008 in PCT Appl. No. PCT/US2006/022686.
Search Report and Written Opinion mailed Jul. 7, 2008 in PCT Appl. No. PCT/US2006/022785.
Search Report and Written Opinion mailed Jun. 18, 2008 in PCT Appl. No. PCT/US2006/027430.
Search Report and Written Opinion mailed Jun. 3, 2008 in PCT Appl. No. PCT/US2006/022783.
Search Report and Written Opinion mailed Mar. 24, 2008 in PCT Appl. No. PCT/US2006/022677.

Search Report and Written Opinion mailed Mar. 24, 2008 in PCT Appl. No. PCT/US2006/022784.
Search Report and Written Opinion mailed May 2, 2008 in PCT Appl. No. PCT/US2006/023280.
Search Report and Written Opinion mailed May 21, 2008 in PCT Appl. No. PCT/US2006/023279.
Search Report and Written Opinion mailed May 22, 2008 in PCT Appl. No. PCT/US2006/022685.
Search Report and Written Opinion mailed Sep. 2, 2008 in PCT Appl. No. PCT/US2006/022769.
Search Report and Written Opinion mailed Sep. 26, 2008 in PCT Appl. No. PCT/US2007/00053.
Search Report and Written Opinion mailed Sep. 3, 2008 in PCT Appl. No. PCT/US2006/022770.
Bekefi et al., "Stimulated Raman Scattering by an Intense Relativistic Electron Beam Subjected to a Rippled Electron Field", Aug. 1979, J. Appl. Phys., 50(8), 5168 - 5164.
European Search Report mailed Nov. 2, 2009 (related to PCT/US2006/022782).
Gervasoni J.L et al., "Plasmon Excitations in Cylindrical Wires by External Charged Particles," Physical Review B (Condensed Matter and Materials Physics) APS through AIP USA, vol. 68, No. 23, Dec. 15, 2003, pp. 235302-1, XP002548423, ISSN: 0163-1829.
Gervasoni, J L., "Excitations of Bulk and Surface Plasmons in Solids and Nanostructures," Surface and Interface Analysis, Apr. 2006, John Wiley and Sons Ltd GB, vol. 38, No. 4, Apr. 2006, pp. 583-586, XP002548422.
Rich, Alan, "Shielding and Guarding, How to Exclude Interference-type noise," Analog Dialogue 17-1, 1983.
Smith et al. "Enhanced Diffraction from a Grating on the Surface of a Negative-Index Metamaterial," Physical Review Letters, vol. 93, Num 13, 2004.
U.S. Appl. No. 11/411,129 - Jan. 28, 2010 PTO Office Action.
U.S .Appl. No. 11/418,079 - Jan. 7, 2010 PTO Office Action.
U.S. Appl. No. 11/418,080 - Jan. 5, 2010 PTO Office Action.
U.S. Appl. No. 11/418,128 - Nov. 24, 2009 PTO Office Action.
U.S. Appl. No. 11/418,263 - Dec. 9, 2009 PTO Office Action.
U.S. Appl. No. 11/418,365 - Feb. 23, 2010 PTO Final Office Action.
Brau et al., "Tribute to John E Walsh", Nuclear Instruments and Methods in Physics Research Section A. Accelerators, Spectrometers, Detectors and Associated Equipment, vol. 475, Issues 1-3, Dec. 21, 2001, pp. xiii-xiv.
Kapp, et al., "Modification of a scanning electron microscope to produce Smith-Purcell radiation", Rev. Sci. Instrum. 75, 4732 (2004).
Scherer et al. "Photonic Crystals for Confining, Guiding, and Emitting Light", IEEE Transactions on Nanotechnology, vol. 1, No. 1, Mar. 2002, pp. 4-11.
U.S. Appl. No. 11/203,407 - Jul. 17, 2009 PTO Office Action.
U.S. Appl. No. 11/418,089 - Jul. 15, 2009 PTO Office Action.
U.S. Appl. No. 11/418,097 - Sep. 16, 2009 PTO Office Action.
U.S. Appl. No. 11/418,123 - Aug. 11, 2009 PTO Office Action.
U.S. Appl. No. 11/418,365 - Jul. 23, 2009 PTO Office Action.
U.S. Appl. No. 11/441,240 - Aug. 31, 2009 PTO Office Action.
Urata et al., "Superradiant Smith-Purcell Emission", Phys. Rev. Lett. 80, 516 - 519 (1998).

* cited by examiner

COUPLING ENERGY IN A PLASMON WAVE TO AN ELECTRON BEAM

CROSS-REFERENCE TO RELATED APPLICATIONS

The present invention is related to U.S. application Ser. No. 11/302,471, entitled "Coupled Nano-Resonating Energy Emitting Structures," filed Dec. 14, 2005, and U.S. application Ser. No. 11/349,963, filed Feb. 9, 2006, entitled "Method And Structure For Coupling Two Microcircuits," the entire contents of each of which are incorporated herein by reference.

The present invention is related to the following co-pending U.S. patent applications which are all commonly owned with the present application, the entire contents of each of which are incorporated herein by reference:

(1) U.S. patent application Ser. No. 11/238,991, filed Sep. 30, 2005, entitled "Ultra-Small Resonating Charged Particle Beam Modulator";

(2) U.S. patent application Ser. No. 10/917,511, filed on Aug. 13, 2004, entitled "Patterning Thin Metal Film by Dry Reactive Ion Etching";

(3) U.S. application Ser. No. 11/203,407, filed on Aug. 15, 2005, entitled "Method Of Patterning Ultra-Small Structures";

(4) U.S. application Ser. No. 11/243,476, filed on Oct. 5, 2005, entitled "Structures And Methods For Coupling Energy From An Electromagnetic Wave";

(5) U.S. application Ser. No. 11/243,477, filed on Oct. 5, 2005, entitled "Electron beam induced resonance,"

(6) U.S. application Ser. No. 11/325,448, entitled "Selectable Frequency Light Emitter from Single Metal Layer," filed Jan. 5, 2006;

(7) U.S. application Ser. No. 11/325,432, entitled, "Matrix Array Display," filed Jan. 5, 2006, (8) U.S. application Ser. No. 11/410,905, entitled, "Coupling Light of Light Emitting Resonator to Waveguide," and filed Apr. 26, 2006;

(9) U.S. application Ser. No. 11/411,120, entitled "Free Space Interchip Communication," and filed Apr. 26, 2006;

(10) U.S. application Ser. No. 11/410,924, entitled, "Selectable Frequency EMR Emitter," filed Apr. 26, 2006;

(11) U.S. application Ser. No. 11/418,126, entitled, "Multiplexed Optical Communication between Chips on A Multi-Chip Module," filed on even date herewith;

(12) U.S. patent application Ser. No. 11/400,280, titled "Resonant Detector for Optical Signals," filed Apr. 10, 2006.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This relates to plasmon waves, and, more particularly, to coupling energy in a plasmon wave to an electron beam.

INTRODUCTION

It is known to couple light onto the surface of a metal, creating a so-called plasmon wave. This effect has been used, e.g., near-field optical microscopy. However, to date there has been no good way to electrically detect a plasmon wave and there has been limited practicality in trying to use plasmons to communicate data.

It is desirable to electrically detect plasmon waves and to use plasmons to communicate data. One reason for this is because plasmons move faster than high frequency signals.

BRIEF DESCRIPTION OF THE DRAWINGS

The following description, given with respect to the attached drawings, may be better understood with reference to the non-limiting examples of the drawings, wherein.

THE PRESENTLY PREFERRED EXEMPLARY EMBODIMENTS

Figure 1:
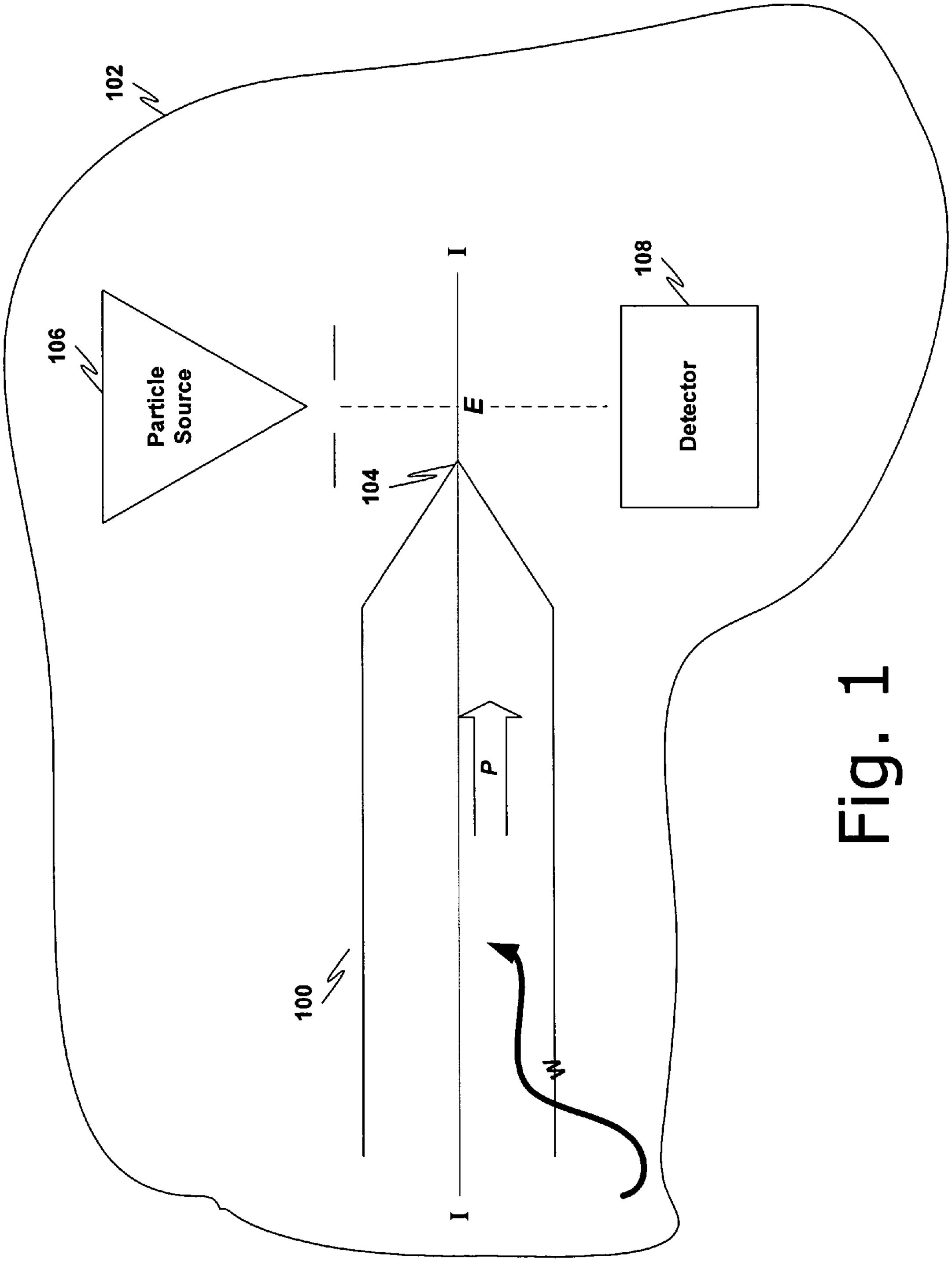
FIGS. 1-2 are top and side views, respectively, of a plasmon wave detector.
Figure 2:
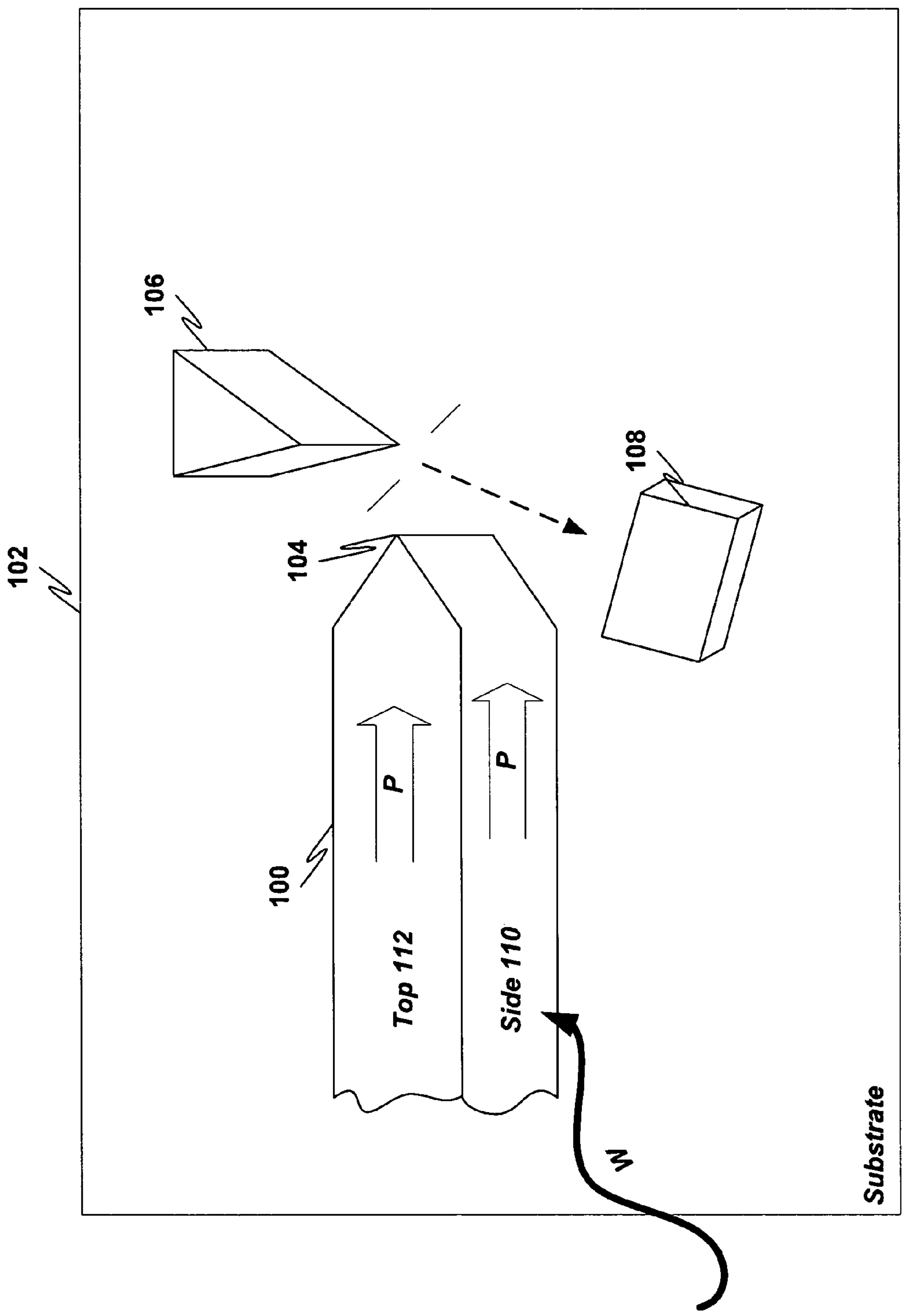

As shown in FIG. 1 a transmission line 100 is formed on a substrate 102. The transmission line 100 (preferably a metal line) preferably has a pointed end (denoted 104 in the drawing). The transmission line 100 may be straight or curved. A source of charged particles 106 and a corresponding detector 108 are positioned so that a beam of charged particles (denoted E in the drawing) generated by the source 106 is disrupted or deflected by a change in the magnetic and/or electric field surrounding the pointed end 104. Preferably the source of charged particles 106 and the corresponding detector are positioned near the pointed end 104 of the transmission line 100. In some cases the beam E may be substantially perpendicular to a central axis of the transmission line.

Although the transmission line is preferably metal, those skilled in the art will realize, upon reading this description, that the transmission line may be formed of other non-metallic substances or of a combination of metallic and non-metallic substances. For example, the transmission line may comprise gold (Au), silver (Ag), copper (Cu) or aluminum (Al). Those skilled in the art will realize and understand, upon reading this description, that different and/or other metals may be used.

Figure 3:
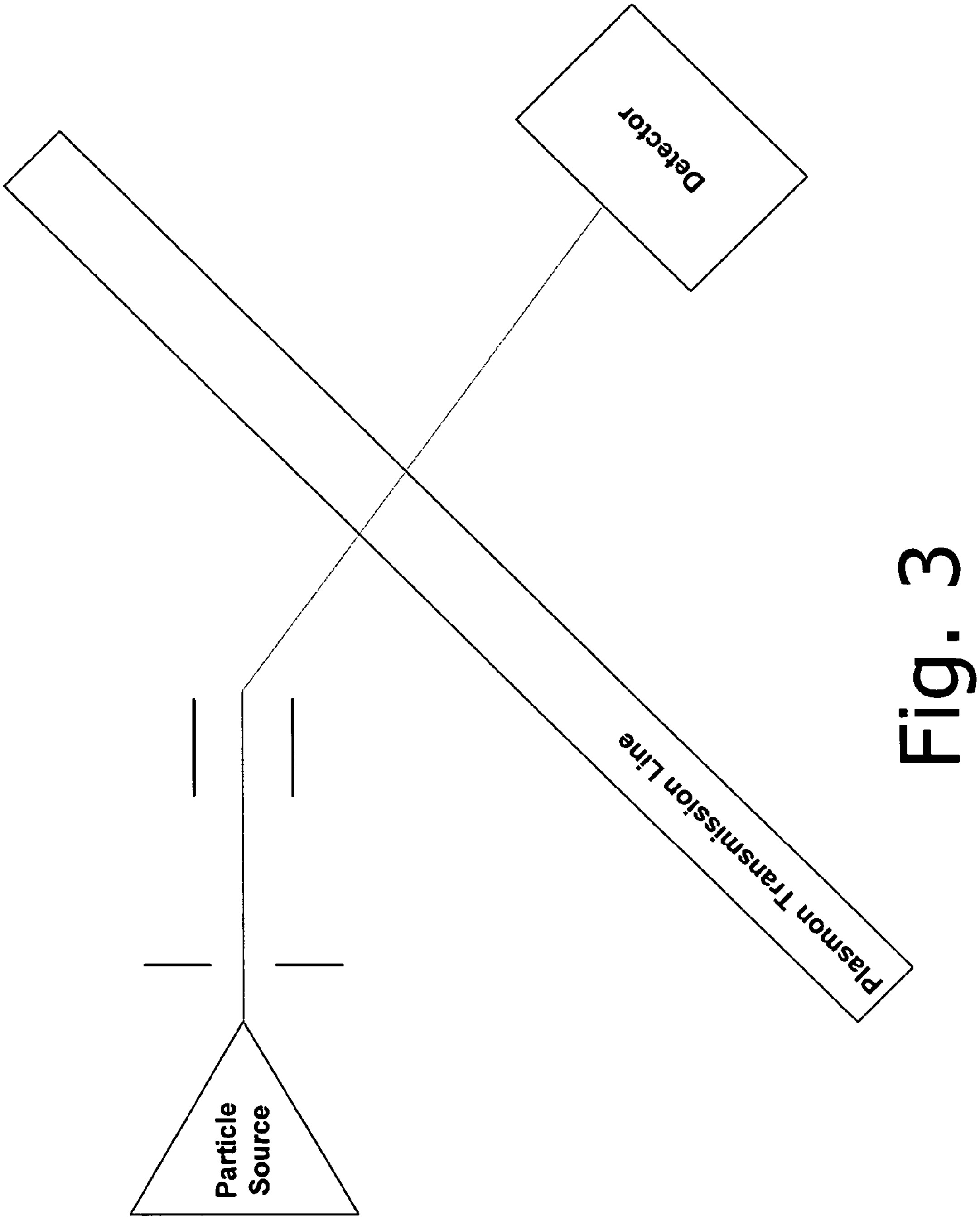
FIG. 3 is a top view of an exemplary plasmon wave detector.

Those skilled in the art will realize, upon reading this description, that the end of the transmission line does not have to have a pointed end. Further, the detector does not have to be at an end of the line, although such embodiments are presently considered to increase the field strength and thus make detection easier. For example, as shown in FIG. 3, the emitter and detector are on opposite sides of the line, and the particle beam is deflected so that it passes adjacent to (in this case over), the transmission line.

The charged particle beam can include ions (positive or negative), electrons, protons and the like. The beam may be produced by any source, including, e.g., without limitation an ion gun, a thermionic filament, a tungsten filament, a cathode, a field-emission cathode, a planar vacuum triode, an electron-impact ionizer, a laser ionizer, a chemical ionizer, a thermal ionizer, an ion-impact ionizer.

The detector 108 is constructed and adapted to detect breaks or deflections of the beam E. Those skilled in the art will realize that the detector 108 can provide a signal indicative of the detected plasmon waves to other circuitry (not shown). The detector may be constructed, e.g., as described in related U.S. patent application Ser. No. 11/400,280, titled "Resonant Detector for Optical Signals," filed Apr. 10, 2006, the contents of which have been fully incorporated herein by reference.

Plasmon waves (denoted P) on the transmission line 100 travel in the direction of the pointed end 104. As the waves reach the pointed end 104, they cause disruption of an electric field around the point which, in turn, deflects the particle beam E. The detector 108 detects the deflection and thereby recognizes the presence and duration of the plasmon waves. Plasmon waves P will travel along the side surface 110 of the transmission line 100 and along the top surface 112.

Plasmon waves may travel in the transmission line 100 for a variety of reasons, e.g., because of a light wave (W) incident on the transmission line. However, this invention contemplates using plasmon wave detector described herein, regardless of the source or cause of the wave. The plasmon wave may contain or be indicative of a data signal.

Since the particle beam emitted by the source of charged particles may be deflected by any electric and/or magnetic field, one or more shields or shielding structure(s) may be added to block out unwanted fields. Such shield(s) and/or shielding structure(s) may be formed on the same substrate as the source of charged particles and/or the transmission line so that only fields from the transmission line will interact with the particle beam.

The devices according to embodiments of the present invention may be made, e.g., using techniques such as described in U.S. patent application Ser. No. 10/917,511, entitled "Patterning Thin Metal Film by Dry Reactive Ion Etching" and/or U.S. application Ser. No. 11/203,407, entitled "Method Of Patterning Ultra-Small Structures," both of which have been incorporated herein by reference. The nano-resonant structure may comprise any number of resonant microstructures constructed and adapted to produce EMR, e.g., as described above and/or in U.S. application Ser. No. 11/325,448, entitled "Selectable Frequency Light Emitter from Single Metal Layer," filed Jan. 5, 2006, U.S. application Ser. No. 11/325,432, entitled, "Matrix Array Display," filed Jan. 5, 2006, and U.S. application Ser. No. 11/243,476, filed on Oct. 5, 2005, entitled "Structures And Methods For Coupling Energy From An Electromagnetic Wave"; U.S. application Ser. No. 11/243,477, filed on Oct. 5, 2005, entitled "Electron beam induced resonance;" and U.S. application Ser. No. 11/302,471, entitled "Coupled Nano-Resonating Energy Emitting Structures," filed Dec. 14, 2005.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A device for coupling energy in a plasmon wave to an electron beam, the device comprising:

a transmission line;

a generator mechanism constructed and adapted to generate a beam of charged particles along a path adjacent to the transmission line; and a detector microcircuit disposed along said path, at a location after said beam has gone past said line, wherein the generator mechanism and the detector microcircuit are disposed adjacent transmission line and wherein a beam of charged particles from the generator mechanism to the detector microcircuit electrically couples the plasmon wave traveling along the transmission line to the microcircuit.

2. A device as in claim 1 wherein the generator mechanism is selected from the group comprising:

an ion gun, a thermionic filament, tungsten filament, a cathode, a vacuum triode, a field emission cathode, a planar vacuum triode, an electron-impact ionizer, a laser ionizer, a chemical ionizer, a thermal ionizer, an ion-impact ionizer.

3. A device as in claim 1 wherein the beam of charged particles comprises particles selected from the group comprising:

positive ions, negative ions, electrons, and protons.

4. A device as in claim 1 wherein the detector microcircuit detects the presence of a plasmon wave in the transmission line.

5. A device as in claim 1 wherein the detector microcircuit detects the absence of a plasmon wave in the transmission line.

6. A device as in claim 1 wherein the transmission line is formed from a metal.

7. A device as in claim 6 wherein the metal comprises a metal selected from the group comprising:

gold (Au), silver (Ag), copper (Cu) and aluminum (Al).

8. A device as in claim 1 wherein the transmission line has a pointed end and wherein the generator mechanism and the detector microcircuit are disposed adjacent the pointed end of the transmission line.

9. A device as in claim 1 further comprising:

shielding structure disposed to prevent interference with the beam of charged particles by sources of electromagnetic radiation (EMR) other than EMR from the transmission line.

10. A method comprising:

generating a beam of charged particles adjacent a metal transmission line; and detecting changes in said beam of charged particles, wherein said changes are indicative of the presence or absence of a plasmon wave in the metal transmission line.

11. A method as in claim 10 wherein the beam of charged particles is generated by a mechanism selected from the group comprising:

an ion gun, a thermionic filament, a cathode, vacuum triode, a planar vacuum triode, an electron-impact ionizer, a laser ionizer, a chemical ionizer, a thermal ionizer, an ion-impact ionizer.

12. A method as in claim 10 wherein the beam of charged particles comprises particles selected from the group comprising:

positive ions, negative ions, electrons, and protons.

13. A method as in claim 12 wherein the step of detecting indicates the presence of a plasmon wave in the metal transmission line.

14. A method as in claim 12 wherein the step of detecting indicates the absence of a plasmon wave in the metal transmission line.

15. A device for coupling energy in a plasmon wave to an electron beam, the device comprising:

a metal transmission line having a pointed end, the metal comprising silver (Ag);

a generator mechanism constructed and adapted to generate a beam of charged particles, wherein the generator mechanism is selected from the group comprising:

an ion gun, a thermionic filament, tungsten filament, a cathode, a vacuum triode, a field emission cathode, a planar vacuum triode, an electron-impact ionizer, a laser ionizer, a chemical ionizer, a thermal ionizer, an ion-impact ionizer;

a detector microcircuit disposed adjacent to the generator mechanism; and shielding structure disposed to prevent interference with the beam of charged particles by sources of electromagnetic radiation (EMR) other than EMR from the transmission line, wherein the generator mechanism and the detector microcircuit are disposed adjacent the pointed end of the transmission line and wherein a beam of charged particles from the generator mechanism to the detector microcircuit electrically couples the plasmon wave traveling along the metal transmission line to the microcircuit.

* * * * *